Feb. 21, 1956   H. R. DUCHESNEAU ET AL   2,735,688
COLLET AND CHUCK
Filed Oct. 24, 1952   3 Sheets-Sheet 1
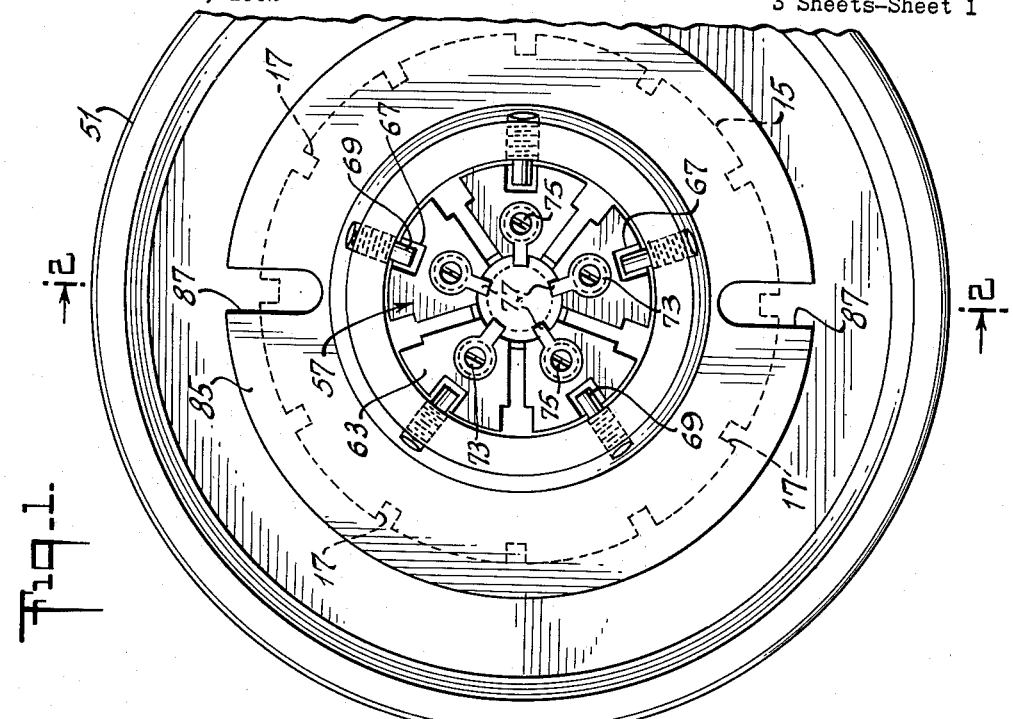
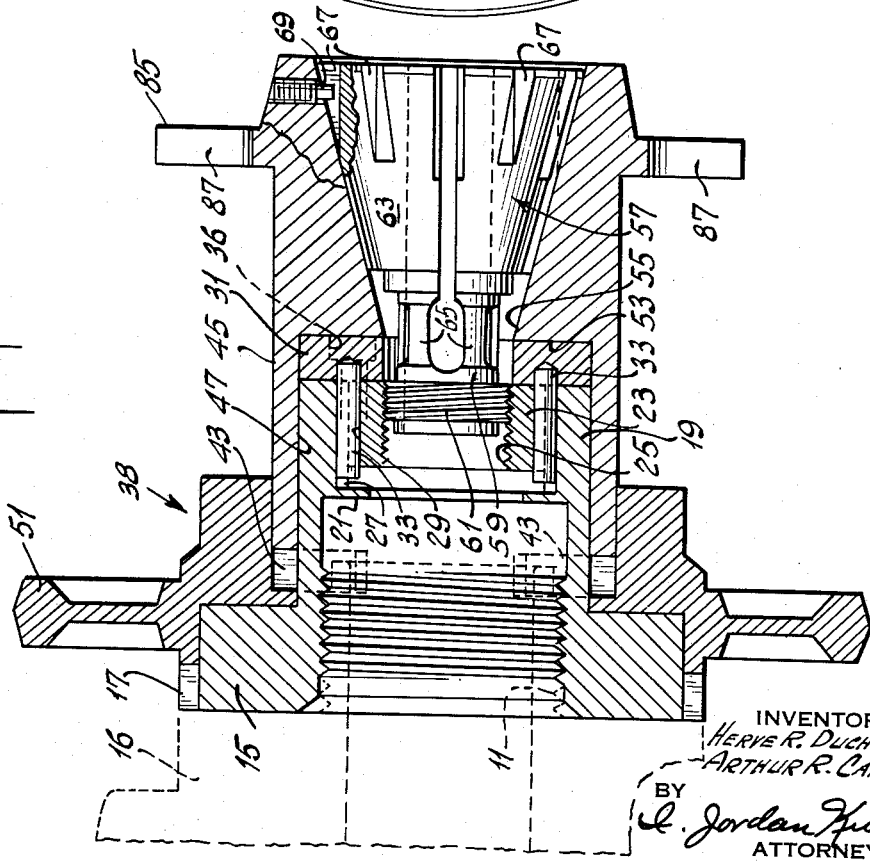
INVENTORS:
HERVE R. DUCHESNEAU
ARTHUR R. CARLING
BY
I. Jordan Kunik
ATTORNEY

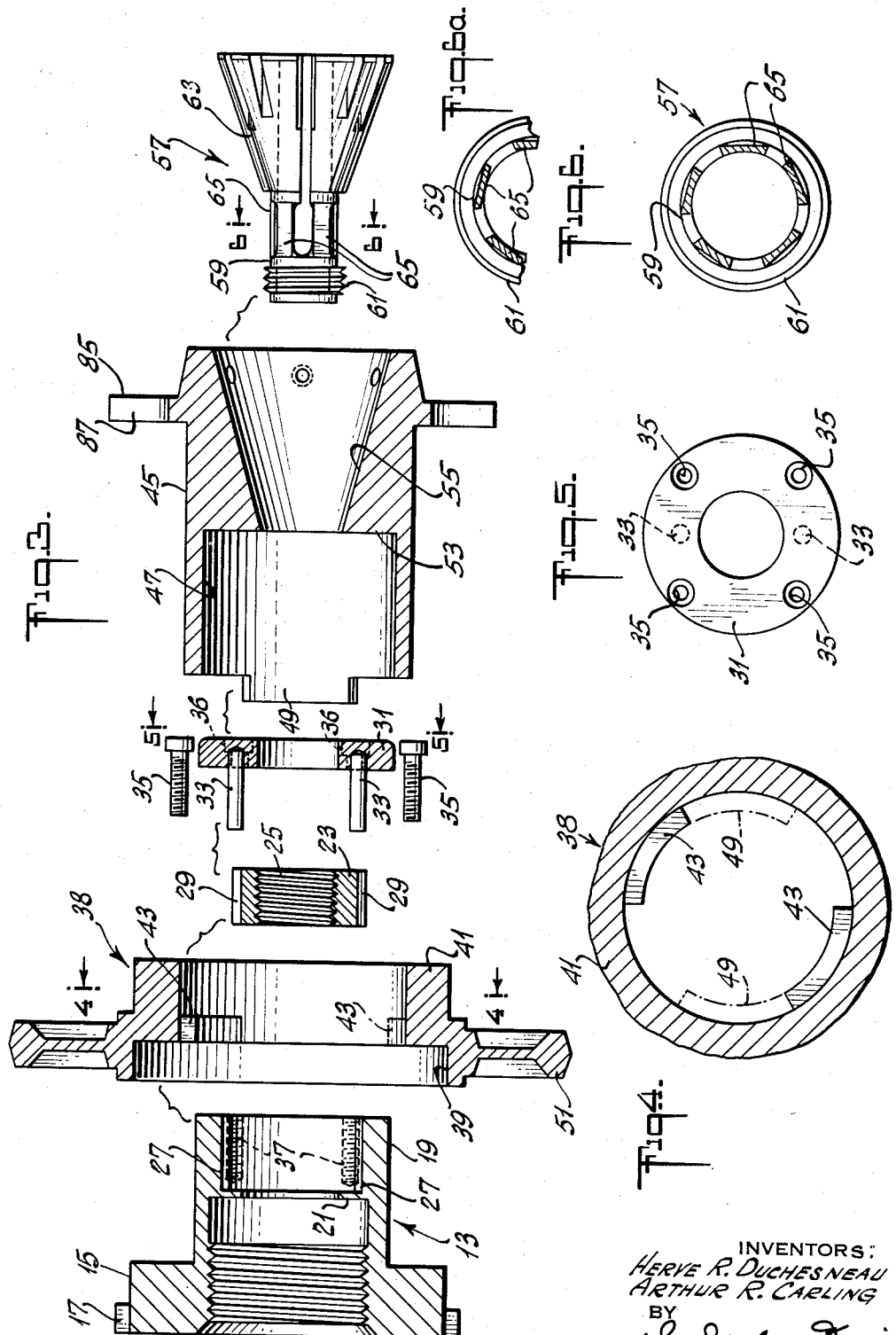

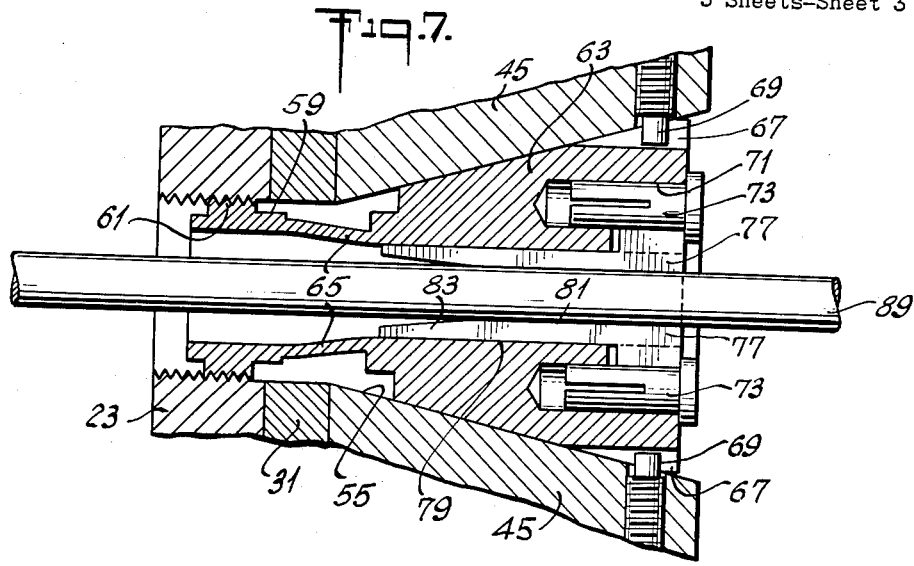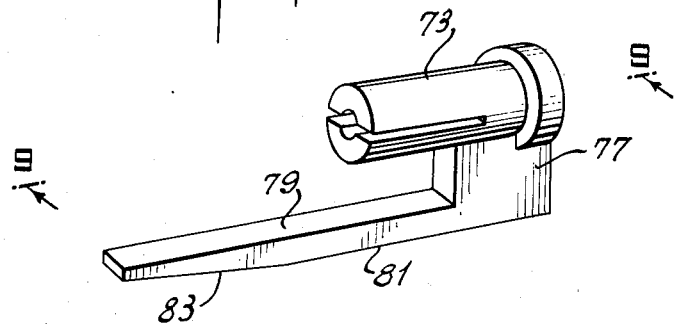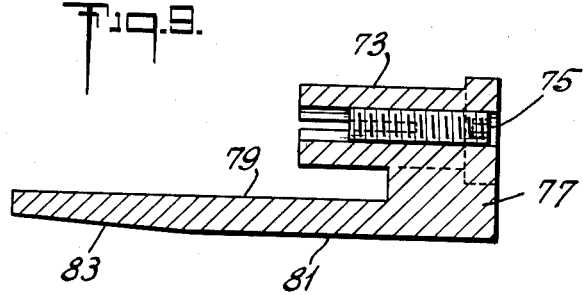

United States Patent Office 2,735,688
Patented Feb. 21, 1956

2,735,688
COLLET AND CHUCK

Herve R. Duchesneau, New Bedford, Mass., and Arthur R. Carling, West Hartford, Conn., assignors to Aco Incorporated, Hartford, Conn.

Application October 24, 1952, Serial No. 316,598

18 Claims. (Cl. 279—53)

This invention relates to lathe chucks and collets and more particularly to an improved combination of novel chuck and collet elements for holding work pieces of different sizes.

The purpose of the invention is to provide an improved work holder for lathes wherein a collet of novel shape and having a novel arrangement of replaceable jaws is combined with an easily assembled chuck apparatus for mounting on the spindle of a lathe or the like.

In prior collet structures, whether of the replaceable jaw type or not, the gripping area of the collet usually extended over a comparatively small circumferential area on the work piece, thus providing an insecure mounting which often resulted in vibration or shimmying of the work. The possibility of vibration of the work piece is obviated by the present invention wherein a plurality of replaceable jaws are provided having elongated gripping surfaces which extend over a considerable longitudinal area of the work piece. These jaws being set into corresponding segments of a collet having a novel articulating structure which permits the elongated gripping surfaces to approach the work piece in such a manner that substantially parallel relationship is maintained between said gripping surfaces relative to each other and to the axial center of the work piece. The chuck body into which said collet is inserted is arranged to produce the appropriate motion upon said segments in accomplishing this result.

Because of the novel arrangement of parts in this invention, considerably fewer sets of replaceable jaws are required than has previously been necessary, since one set of jaws can accommodate a considerable range in sizes of work pieces because the collet segments are movable over a wide range.

Still other objects and advantages of our invention will be apparent from the specification.

The features of novelty which we believe to be characteristic of our invention are set forth with particularity in the appended claims. Our invention, itself, however, both as to its fundamental principles and as to its particular embodiments, will best be understood by reference to the specification and accompanying drawings, in which:

Figure 1 is a face view, partially broken away and partly in phantom outline of the chuck and collet of the present invention;

Fig. 2 is a view, partly in cross section, taken on line 2—2 of Fig. 1;

Fig. 3 is an exploded view, partly in cross section, of the elements shown in Fig. 2;

Fig. 4 is a cross section view taken on line 4—4 of Fig. 3;

Fig. 5 is an end view taken along line 5—5 of Fig. 3;

Fig. 6 is a cross section view taken on line 6—6 of Fig. 3;

Fig. 6A is a fragmentary portion of Fig. 6, showing a modification thereof;

Fig. 7 is an enlarged schematic detail view, partly in cross section, similar to Fig. 2, and showing the interaction between the chuck and collet in holding a work piece;

Fig. 8 is a perspective view of one of the replaceable jaw elements utilized in the present invention; and Fig. 9 is a cross section view taken on line 9—9 of Fig. 8.

Referring now to the drawings in detail, and with special reference to Figs. 2 and 3, the elements of the present invention will be described in the order in which the various components thereof are assembled on the spindle of a machine, said spindle being represented by the numeral 11.

A cylindrical body generally designated 13 is threadably mounted on spindle 11. Body 13 has a circular flange 15, the rearward face of which abuts the forward face of spindle shoulder 16. Slots 17 may be provided in the outer periphery of flange 15 in order to permit the utilization of a suitable key or wrench to tighten or loosen body 13 upon the spindle. Body 13 has a forwardly extending cylindrical portion 19 in which an annular ring 21 is positioned, said ring providing a stop for the movement of a cylindrical nut 23 received within portion 19 and having an internal threaded aperture 25. The space formed between the forward mouth of portion 19 and ring 21 provides a chamber in which nut 23 is longitudinally slideable.

The internal aperture of portion 19 is provided with a pair of peripheral longitudinal slots or keyways 27, while nut 23 is also provided with a pair of external peripheral longitudinal slots 29, said slots in each pair being respectively positioned 180° apart so that when nut 23 is inserted within portion 19, said respective slots together form two holes or keyways. All the slots 27 and 29 may be semicircular in contour so that when respective slots 27 and 29 are matched to each other, they form a cylinder for the reception of a round pin.

A nut retainer ring 31 is provided with pins 33 which are adapted to fit into the keyways formed by slots 27 and 29 and when so inserted, the rear face of nut retainer ring 31 is flush against the forward face of portion 19. Nut retainer 31 is secured to portion 19 by means of screws 35, which may be of the recessed head type, the heads of said screws fitting into recesses 36 shown in phantom outline in Fig. 3. By means of pins 33, the rotary motion of spindle 11 is transmitted through rotating body 13 to nut 23. For the sake of clarity screws 35 are illustrated in the exploded view of Fig. 3, as being outside ring 31, whereas in reality they are actually inside said ring (Figs. 2 and 5), and are inserted into threaded holes 37 shown in phantom outline in cylindrical portion 19.

The internal periphery of ring 31 is smaller in diameter than that of cylindrical portion 19, thereby forming a shoulder which limits the forward longitudinal movement of nut 23.

A ring wheel, generally designated 38, is then mounted over flange 15 of body 13, a suitable circular recess 39 being provided in said wheel to accommodate said flange. Wheel 38 is provided with a forward cylindrical portion 41 in the aperture of which two arcuate cams 43 are positioned substantially opposite each other.

A generally cylindrical chuck body 45 having a cylindrical aperture 47 adapted to fit snugly over portion 19 of body 13 is rotatably mounted over said portion 19 and over ring 31. The rearward cylindrical portion of chuck body 45 fits between and is rotatable relative to both portion 19 and the forward portion 41 of wheel 38.

The rearward cylindrical portion of chuck body 45 has two cam extensions 49 positioned opposite each other and which are adapted to be engaged by cams 43 of wheel 38 for rotating said chuck body. See Fig. 4. A wheel rim 51 is provided on wheel 38 to serve as a gripping means for manually rotating said wheel and accordingly chuck body 45 by means of the cams. It will be noted from Fig. 4, that the combined circumferential length of the sets of cams 43 and 49 is somewhat less than 360°. This arangement is provided in order that the operator may grasp wheel rim 51 and give it a yanking or jerking rotation so that the impact force of the cooperating edges of said cams facilitates the tightening or loosening of the collet and chuck body as will be described hereinafter.

Approximately intermediate the forward and rearward ends of chuck body 45 is a circular shoulder 53 which abuts against the forward ends of retainer ring 31, said abutting portions forming a friction drive that will be described hereinafter.

The forward portion of chuck body 45 has an internal aperture whose walls 55 are in the form of a truncated circular cone. Inserted in and through said cone is a shuttlecock type collet, generally designated 57, whose hub 59 extends inward beyond shoulder 53 of chuck body 45. See Fig. 2. Said hub is provided with threads 61 which are engageable by threads 25 of nut 23.

Extending forward from hub 59 are a plurality of wedge shaped collet segments 63 each of which is connected to said hub by means of a rearward comparatively thin portion of said segment or by resiliently deflectable spring members 65. The peripheral surfaces of the respective collet segments 63 are dimensioned to coact with cone walls 55 in chuck body 45 whereby longitudinal motion of said collet within said body causes all portions of said segments to move substantially laterally and equally toward and from the axial center line of said collet without any radial motion being imposed upon the segments relative to hub 59. The extended length of walls 55 and the cooperating extended length of the outer periphery of the shuttlecock type collet brings about this desired action on the part of the segments. This motion on the part of segments 63 is also facilitated by making the spring members 65 as thin as possible commensurate with the requirements of strength and durability.

As will be noted in Fig. 7, spring members 65 do not bend with a simple radial motion, but bend in a virtual double curve in order to permit substantially all portions of segments 63 to approach in a direction normal to the center axial line without any angular deflection. Said spring members may be slightly curved as shown in Fig. 2, but they may also be ground flat on one side as shown in the cross sectional view of Fig. 6 to permit this complex bending action. Alternatively, said spring members may be ground flat on both sides as shown in Fig. 6A.

The illustration in Fig. 7 is schematic, particularly as it pertains to spring members 65 which are positioned opposite each other as if the collet had only four segments instead of five, as shown in the remaining figures. This schematic representation was made for the sake of clarity in illustrating the double bending action of spring members 65.

Each segment 63 is provided on its outer periphery with a longitudinal slot 67 which accommodates a pin 69 connected to and extending inwardly from wall 55 of collet chuck 45 near the mouth of the cone. Said pins permit the longitudinal movement of collet 63 within collet chuck 45 but any rotational movement of said collet causes the rotational movement of said chuck.

Replaceable jaws are provided for the collet for holding the work piece rigidly in position. In the forward face of each segment 63 there is a longitudinal recess 71 (Fig. 7) which accommodates a removable split sleeve 73 having a screw 75 (Fig. 9) threadable into the central longitudinal aperture thereof. The split sleeve member 73 may be tightened into, or removed from, aperture 71 by turning screw 75.

Sleeve 73 has a bracket portion 77 extending substantially perpendicularly to the central axis of sleeve 73.

Attached to bracket 77 is a relatively narrow longitudinal gripping jaw 79 which extends rearwardly from the forward face of collet 63, and into the axial aperture thereof. Each gripper jaw 79 has a gripping face 81 which, at its rearward portion, terminates in an outwardly inclining cam face 83. Gripping face 81, in conjunction with the gripping faces of other similar jaws in the other segments of the collet, hold a work piece firmly between them. Cam face 83 is provided in order to permit the insertion of a tool from the rear through the lathe spindle into position between said gripping faces without the danger of dislodging gripping jaws 79.

It will be noted that the length of gripping face 81 may be equal to or somewhat greater in dimension than the diameter of the work piece inserted within the collet, as indicated schematically in Fig. 7. By providing such an extended gripping surface over a longer longitudinal portion of the work piece than is provided by other replaceable jaws in the art, a greater stability of said work piece is obtained because of the elimination of any wobbling or shimmying on the part of the work piece under the torque stress of the cutting tool.

It will also be noted that such an extended length of the gripping faces 81 is made possible only because of the novel arrangement of camming substantially all portions of the collet segments equally toward the axial center of the collet in such a manner as to cause said gripping faces 81 to maintain a substantially parallel relationship in all positions relative to said axial center. This is also made possible by virtue of the relative thinness of spring members 65 by which collet segments 63 are mounted on collet hub 57.

Since the spring members 65 may be flexed a considerable distance thereby permitting substantially all portions of segments 63 to move toward or away from each other a correspondingly large distance, it is possible to use one set of replaceable jaws 79 over a wide variance in the diametrical size of the work piece to be held by the collet.

The wide range of motion of said collet segments 63 is also made possible by the comparatively wide radial spaces by which said collets are separated from each other.

In contrast to other chucking arrangements, wherein it is necessary to have a series of approximately sixty-two collets for accommodating a range of 0 to 1" in the diameter of work pieces, the present invention requires only eleven sets of jaws for the same dimentional requirements. The cost of making eleven sets of replaceable jaws according to the present invention is only a small fraction of the cost of making sixty-two conventional type collets. Also considerable work time is saved when the operator of a machine is not required to change collets as frequently with the present replaceable jaws as he is required to do with conventional collets each of which permit only a variance of dimensional differential of 1/64". With the present replaceable jaw collet, the range of variance in diameter differential of the work piece is extended substantially to five times the dimensional variance permitted by the conventional collets.

For each set of jaws it will only be necessary to vary the radial length of bracket 77, while the gripping faces 81 of jaws 79 may be ground in sets to provide the proper alignment of said gripping faces relative to the axial center of collet 57.

In practice, each segment 63 would be numbered with each replaceable jaw having a corresponding number, so that, upon replacement, the proper jaw will be fitted into the proper segment. Since the connecting portions of the replaceable jaws are inserted into the outer face of each segment, the operator of the machine is not required to disassemble the collet from the chuck in order to change jaws. This structure saves considerable work time in changing jaws for different sizes of work pieces.

A face plate 85 may be built as part of the chuck body 45 which it surrounds, said face plate having suitable slots 87 for accommodating a lathe dog.

In assembling the chuck and collet device described herein, after the parts have been inserted in place in accordance with the sequence described herein, wheel 51 is rotated manually thereby rotating chuck body 45 by the action of cooperating cams 43 and 49. The rotation of chuck body 45 also rotates collet 57 by means of pins 69 acting in slots 67; and as collet 57 rotates, hub 59 is threadably tightened into nut 23 thereby drawing collet 57 rearward into chuck body 45, the action of said collet being stopped by the work piece 89 (Fig. 7) held between jaw faces 81.

The tightening of hub 59 in nut 23 and the rearward motion of collet 63 serve to urge the surface of shoulder 53 against the forward face of retainer ring 31, thereby providing a friction coupling and drive between spindle body 13 and chuck body 45. It will be noted that while performing work on the work piece 89 by means of a tool (not shown) the torque applied to the work piece will increase the frictional engagement between shoulder 53 and retainer ring 31, thereby increasing the efficiency of the novel arrangement of components of the present invention.

It will also be noted that when hub 59 of collet 63 is completely threaded into nut 23 to hold a work piece 89, as shown in Fig. 7, a certain portion of threading 25 remains unoccupied in the rearward portion of nut 23. This unused portion of threading 25 may be utilized for the insertion of a machine piece which extends rearward through the hollow center of spindle 11 so that it may be attached to some device that may be operated manually, by air pressure means or other automatic means. Thus sufficient space is provided between retainer ring 31 and collar 21 to permit the longitudinal movement of nut 23 to move collet 63 longitudinally inward or outward in chuck 45 by automatic means.

In some embodiments, the generally longitudinal jaws may constitute a permanent part of each segment and it is within the contemplation of the present invention that all portions of each segment behind the tool gripping surfaces of said jaws are moved equidistantly toward the axial center of the collet by the interaction between the outer peripheral surfaces of said segments and the internal camming surface of the chuck body. Also, the gripping surfaces of the jaws, whether replaceable or not, may be somewhat wider than illustrated in the drawing, provided they avoid the structure of prior art collets which generally produce a gripping action in a substantially circular manner on a very short longitudinal area of the work piece.

It is also a salient feature of the present invention that all chuck, collet and replaceable jaw manipulations by the operator are performed at or near the operating end of the lathe spindle, and the operator is not required to make any adjustments at the other end of the spindle that extends through the motor control areas of the lathe. Time and energy in performing machine tool operations are thus conserved.

In the specification, we have explained the principles of our invention, and the best mode in which we have contemplated applying those principles, so as to distinguish our invention from other inventions; and we have particularly pointed out and distinctly claimed the part, mode or combination which we claim as our invention or discovery.

While we have shown and described certain preferred embodiments of our invention, it will be understood that modifications and changes may be made without departing from the spirit and scope thereof, as will be clear to those skilled in the art.

We claim:

1. A work holding apparatus for a lathe or the like comprising a spindle body attachable on the spindle of a machine, a threaded nut within said body and freely movable longitudinally therein, a chuck body, a collet insertable through the axial aperture of said chuck body and engageable by said nut, the engagement of said nut and said collet causing said chuck body to be frictionally engaged by said spindle body.

2. Apparatus according to claim 1, and further comprising means on said spindle body for causing said nut to rotate with said spindle body.

3. Apparatus according to claim 2, and further comprising means in the axial center of said chuck body and means on said collet, both of said means cooperating to cause the simultaneous rotation of said collet and said chuck body.

4. Apparatus according to claim 3 wherein said cooperating means comprise a series of pins in the axial aperture of said chuck body and longitudinal slots on the outer periphery of said collet, each of said pins cooperating with a respective slot.

5. Apparatus according to claim 4 wherein means for causing said nut to rotate with said spindle body comprise slots in the outer periphery of said nut and corresponding slots in the inner periphery of said spindle body and pins inserted into corresponding pairs of spindle body slots and nut slots.

6. Apparatus according to claim 5 wherein said collet is movable longitudinally within said chuck body and comprises a hub portion threadably engageable by said nut and a plurality of work holding segments, the work gripping surfaces of each of said segments extending longitudinally within the axial aperture of said collet, the engaging surfaces of said chuck body and said segments causing all parts of said work holding surfaces to approach the axial center of said collet equidistantly.

7. Apparatus according to claim 6 wherein the portions of said segments next adjacent said hub portion are relatively thin and flexible to permit said equidistant movement of said work holding surfaces.

8. Apparatus according to claim 7 and further comprising a replaceable work holding jaw in each of said segments, the work holding surfaces of said jaws extending longitudinally within said axial aperture.

9. Apparatus according to claim 8 wherein said replaceable jaws are insertable into the front faces of said segments.

10. Apparatus according to claim 9 and further comprising a ring wheel rotatably mounted over said spindle body, cam elements on said ring wheel, and cam elements on said chuck body cooperating with said first mentioned cam elements whereby the rotation of said wheel causes the rotation of said chuck body.

11. A work holding apparatus comprising a generally cylindrical body attachable on the spindle of a lathe, a chamber in said body, a nut in said chamber movable longitudinally therein, a ring attached to said body and arranged to retain said nut in said chamber, means on said ring connecting said nut to said chamber whereby the rotation of said body causes the rotation of said nut, a wheel mounted rotatably around said body, cam means on the internal periphery of said wheel, a chuck body having a generally circular aperture which fits over a portion of said first named body, cam elements on said chuck body engageable by the cams of said wheel, a generally conical aperture in said chuck body communicating with said circular aperture in said chuck body, a collet adapted to be inserted through and fitting with said conical aperture and movable longitudinally therein, a hub on said collet threadably engageable by said nut, a plurality of wedge like segments on said collet, a plurality of spring members each connecting a respective segment to said hub, a peripheral longitudinal slot in each of said segments, a plurality of pins extending outward from said cone surfaces and each engageable with a corresponding longitudinal slot in said collet segments, whereby the rotation of said collet causes the rotation of said chuck body, a replaceable jaw connected to each of said segments, each of said jaws having a gripping surface extending longitudinally relative to the axial center of said collet, said cone surfaces and the peripheral surfaces of said segments being arranged to cooperate whereby upon the inward movement of said collet all portions of each segment approach the axial center of said collet equally and all portions of said gripping surfaces approach equally toward said axial center, a shoulder between said cone and said circular aperture which abuts and is urged against said ring as said collet is drawn into said chuck body whereby a frictional drive engagement is maintained between said ring and said chuck body.

12. Apparatus according to claim 11 in which keyways are provided in the internal peripheral surface of said first mentioned chamber and corresponding keyways are provided in the external periphery of said nut, said means on said ring comprising at least one pin which fits into a pair of opposing keyways in said chamber and on said nut whereby rotary motion is transmitted from said first mentioned body to said nut.

13. A work holding apparatus for a lathe or the like, comprising a spindle body attachable on the spindle of a machine, a collet grasping means within said body, said means connected to rotate with said body and movable longitudinally therein, a chuck body, a collet insertable through the axial aperture of said chuck body and engageable by said means, the engagement of said means with said collet causing said collet to urge said chuck body against said spindle body whereby said chuck body is frictionally engaged by said spindle body.

14. Apparatus according to claim 13 wherein said means comprises a nut having an internal threaded aperture for engaging said collet, the rearward portion of said threaded aperture being free when said collet is tightened about a work piece for the reception of a threaded apparatus for auxiliary operation of said collet longitudinally in said chuck body.

15. A collet for a machine tool comprising a ring hub, a plurality of segments, said segments extending longitudinally and radially from said hub, a plurality of resilient members each connecting a corresponding segment to said hub, all parts of said segments being adapted to be moved equidistantly toward the axial center of said collet, a replaceable jaw inserted into each segment, said replaceable jaws each having a gripping face extending longitudinally relative to the central axis of said collet and facing said central axis, all portions of said gripping faces being movable equidistantly toward said axial center, an aperture in the front face of each segment, a portion of a jaw removably insertable in a respective aperture, said insertable portion having a split sleeve and a screw threadably inserted into said sleeve and adapted to fix said sleeve firmly in position within said aperture.

16. A work holding apparatus comprising a chuck body, an aperture in said chuck body, a collet, a hub on said collet, a plurality of outwardly extending segments on said collet, a plurality of spring members each connecting a respective segment to said hub, the contour of said aperture and the contour of the mating surfaces of said segments with said aperture being arranged whereby the movement of said collet inwardly into said chuck body produces a double curve in said spring members.

17. A work holding apparatus comprising means for attaching said apparatus upon the spindle of a lathe, a chuck body connected to said first means, a collet retaining means positioned between said chuck body and said first means, and a collet insertable into said chuck body and engageable by said collet retaining means, said collet retaining means being movable longitudinally between said first means and said chuck body.

18. Apparatus according to claim 17, and further comprising means connected to said chuck body and adapted to rotate said body, and means in said chuck body for rotating said collet.

References Cited in the file of this patent

UNITED STATES PATENTS

| | | |
|---|---|---|
| 1,370,598 | Lapointe | Mar. 8, 1921 |
| 1,463,176 | Schieldge | July 31, 1923 |
| 2,211,344 | Montgomery | Aug. 13, 1940 |
| 2,219,008 | Drissner | Oct. 22, 1940 |
| 2,261,899 | Bechert | Nov. 4, 1941 |
| 2,415,482 | Greenough | Feb. 11, 1947 |
| 2,493,926 | Petsche | Jan. 10, 1950 |
| 2,557,301 | Lundy | June 19, 1951 |